(12) United States Patent
Tsai

(10) Patent No.: US 7,862,222 B2
(45) Date of Patent: Jan. 4, 2011

(54) BACKLIGHT MODULE AND LIGHT GUIDE PLATE

(75) Inventor: Kun-Jung Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 180 days.

(21) Appl. No.: 12/276,582

(22) Filed: Nov. 24, 2008

(65) Prior Publication Data

US 2009/0290377 A1 Nov. 26, 2009

(30) Foreign Application Priority Data

May 20, 2008 (CN) .................. 2008 1 0301669

(51) Int. Cl.
*F21V 7/04* (2006.01)

(52) U.S. Cl. .................. 362/616; 362/607; 362/606; 362/612; 362/613

(58) Field of Classification Search .................. 362/606, 362/607, 600, 612, 613, 616
See application file for complete search history.

(56) References Cited

U.S. PATENT DOCUMENTS

| | | | |
|---|---|---|---|
| 6,474,826 B1 * | 11/2002 | Tanaka et al. ................ | 362/612 |
| 6,799,860 B2 * | 10/2004 | Nakaoka et al. ............. | 362/615 |
| 2004/0223314 A1 * | 11/2004 | Ching-Huang et al. ........ | 362/31 |
| 2006/0002138 A1 * | 1/2006 | Nakagawa et al. .......... | 362/600 |
| 2006/0109684 A1 * | 5/2006 | Nesterenko et al. ......... | 362/610 |
| 2007/0189036 A1 * | 8/2007 | Chen et al. .................. | 362/613 |

* cited by examiner

*Primary Examiner*—Evan Dzierzynski
(74) *Attorney, Agent, or Firm*—Andrew C. Cheng

(57) ABSTRACT

A backlight module includes a light guide plate and two light emitting elements for emitting light beams. The light guide plate includes first and second light guide portions and a connecting portion interconnecting the first and second light guide portions. The first light guide portion has two opposite first light incident surfaces at opposite sides thereof, and a first light output surface. The second light guide portion has a second light incident surface facing first light output surface of the first light guide portion. Each of the light emitting elements faces one of the first light incident surfaces of the first guide portion. The first guide portion receives the light beams via the first light incident surfaces and output them via the first light output surface. The second light guide portion receives the light beams from the first light output surface via the second light incident surface.

14 Claims, 3 Drawing Sheets

BACKLIGHT MODULE AND LIGHT GUIDE PLATE

BACKGROUND

1. Technical Field

The present invention relates to a backlight module, and to a light guide plate of the back light module.

2. Description of Related Art

Backlight modules are widely used in various electronic devices. Referring to FIG. 3, a typical backlight module 10 is shown. The backlight module 10 includes a light guide plate 12 and a plurality of light emitting elements 11 for emitting light beams. The light beams coverage of each of the light emitting elements 11 is usually in an angle no more than of 120 degree. The light guide plate 12 has a light incident surface 120 and a light output surface 122 adjacent to the light incident surface 120. The plurality of light emitting elements 11 face to the light incident surface 120.

However, as shown in FIG. 3, a dark area 124 between each adjacent two light emitting elements 11 occurs in the light guide plate 12. In this way, a uniform light from the light output surface 122 can not be obtained.

What is needed, therefore, is a backlight module and a light guide plate, which can overcome the above shortcomings.

SUMMARY

A backlight module includes a light guide plate and two light emitting elements for emitting light beams. The light guide plate includes a first light guide portion, a second light guide portion and a connecting portion. The first light guide portion has two opposite first light incident surfaces at opposite sides thereof, and a first light output surface. The second light guide portion has a second light incident surface facing first light output surface of the first light guide portion. The connecting portion interconnects first light output surface of the first light guide portion and the second light incident surface of the second light guide portion. Each of the light emitting elements faces one of the first light incident surfaces of the first guide portion. The first guide portion receives the light beams via the first light incident surfaces and output them via the first light output surface. The second light guide portion receives the light beams from the first light output surface via the second light incident surface.

Other advantages and novel features of the present backlight module and light guide plate will become more apparent from the following detailed description of embodiment when taken in conjunction with the accompanying drawings.

BRIEF DESCRIPTION OF THE DRAWINGS

Many aspects of the backlight module and light guide plate can be better understood with reference to the following drawings. The components in the drawings are not necessarily drawn to scale, the emphasis instead being placed upon clearly illustrating the principles of the present backlight module and light guide plate. Moreover, in the drawings, like reference numerals designate corresponding parts throughout the several views.

DETAILED DESCRIPTION OF THE EMBODIMENTS

Embodiments of the present backlight module and light guide plate will now be described in detail below and with reference to the drawings.

Figure 1:
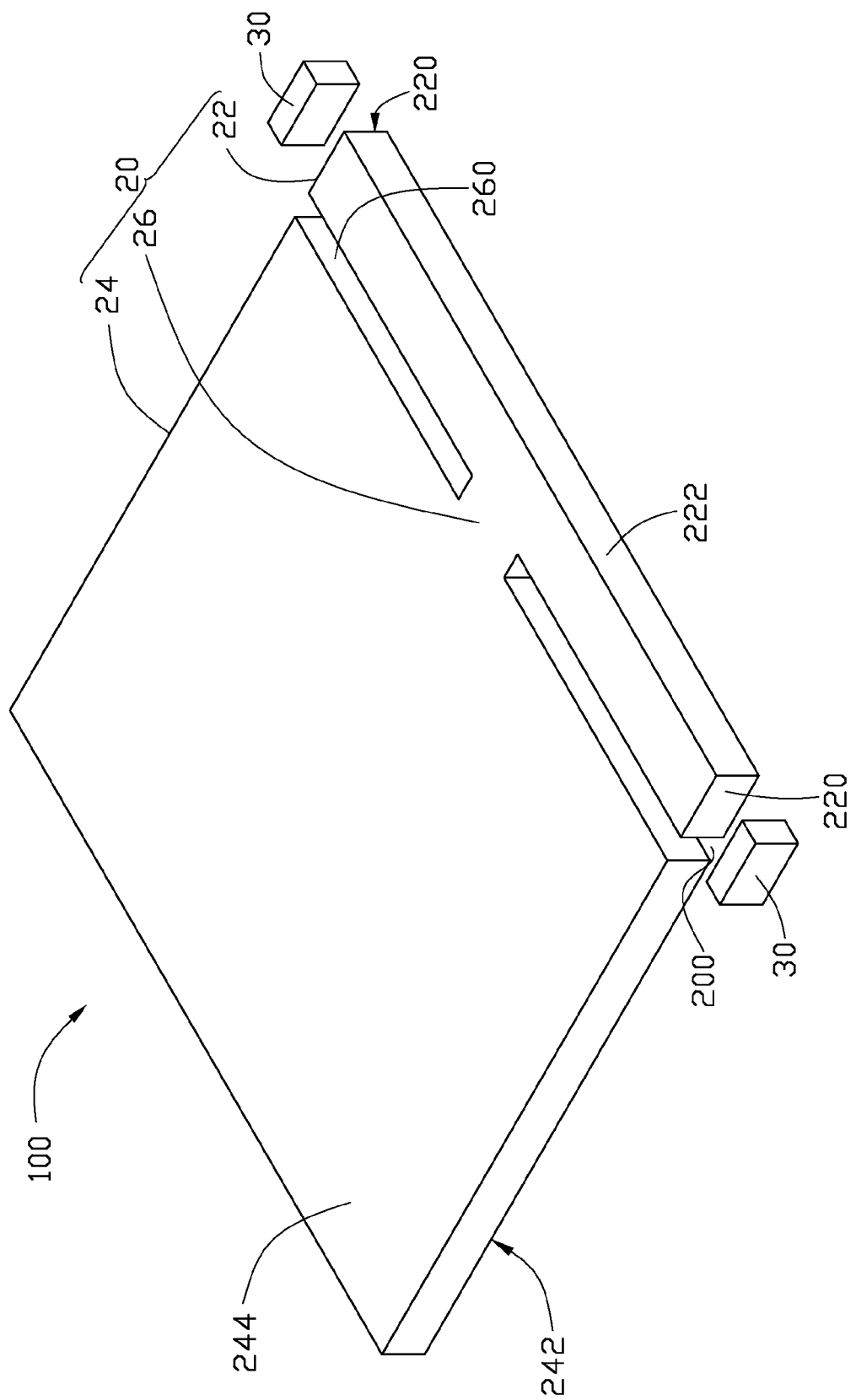
FIG. 1 is a backlight module including a light guide plate in accordance with an exemplary embodiment.
Figure 2:
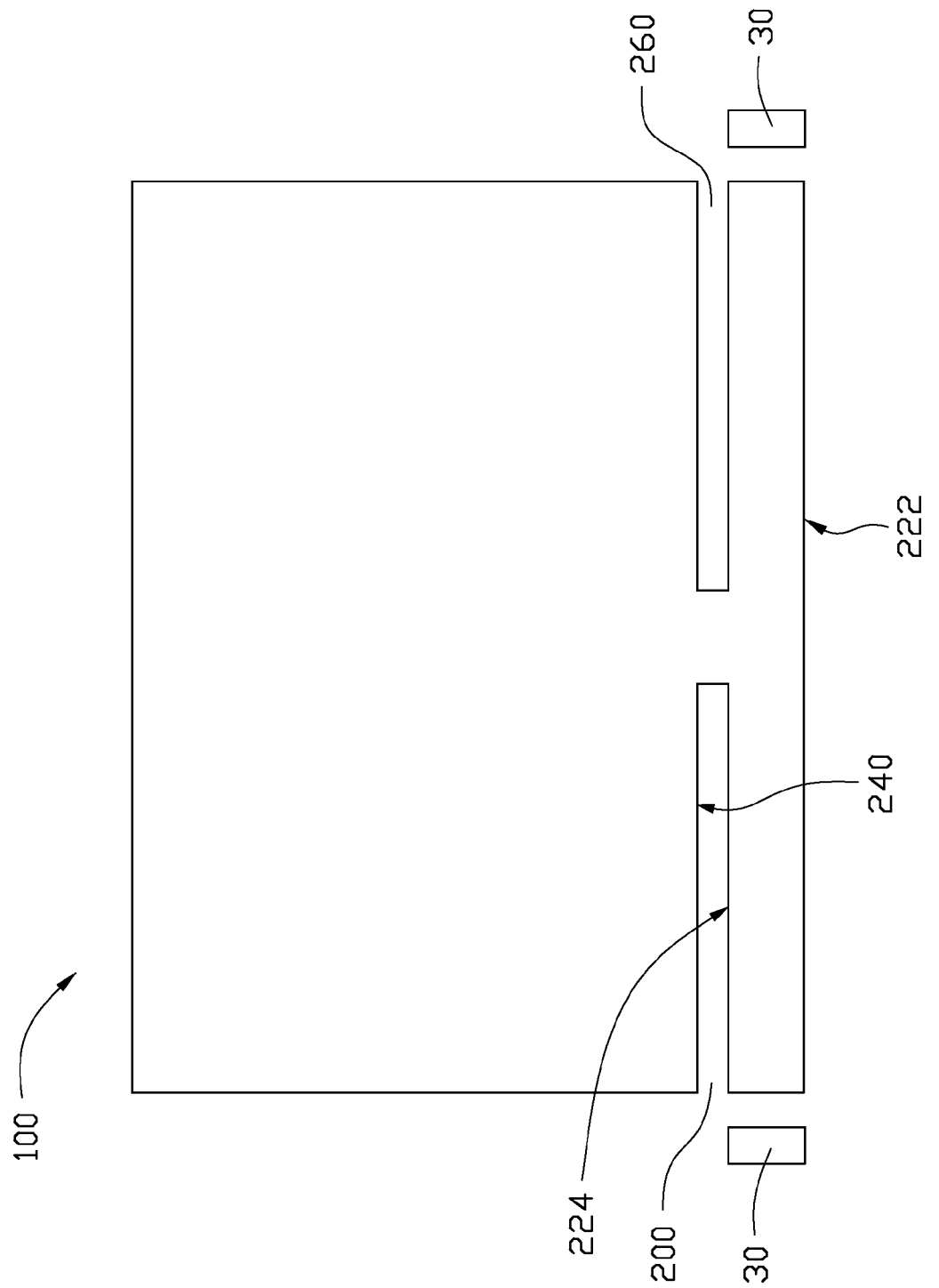
FIG. 2 is a plan view of the backlight module shown in FIG. 1.
Figure 3:
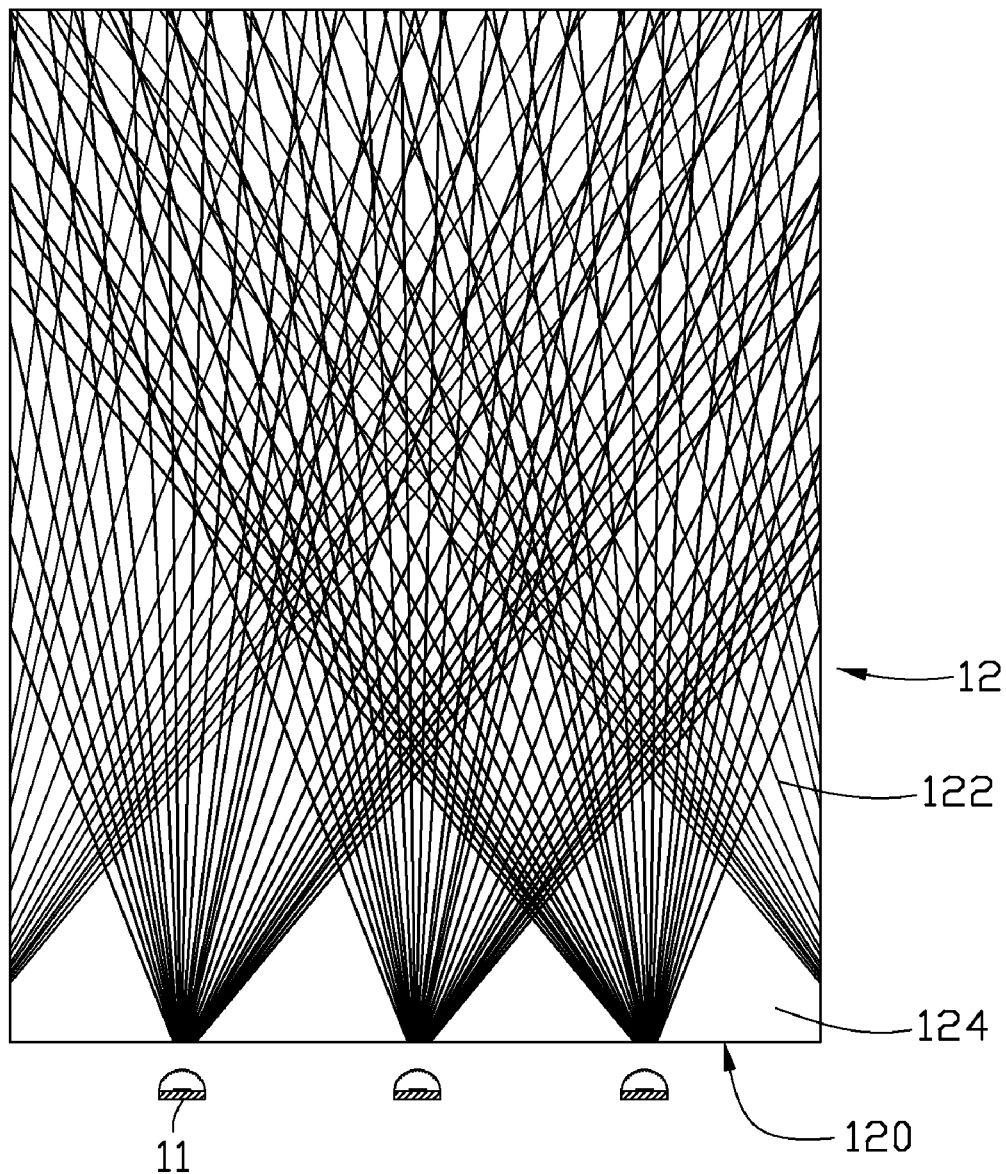
FIG. 3 shows a conventional backlight module.

Referring to FIGS. 1 and 2, a backlight module 100 in accordance with an exemplary embodiment, is provided. The backlight module 100 includes a light guide plate 20 and two light emitting elements 30 for emitting light beams.

The light guide plate 20 includes a first light guide portion 22, a second light guide portion 24 and a connecting portion 26. The first light guide portion 22, the connecting portion 26 and the second light guide portion 24 are integrally formed into a unitary piece. In the illustrated embodiment, a width of the first light guide portion 22 is smaller than the second light guide portion 24, i.e., the first light guide portion 22 is narrower than the second light guide portion 24. A length of the first light guide portion 22 is equal to that of the second light guide portion 24. A first gap 200 and an opposite second gap 260 are defined between the first light guide portion 22 and the second light guide portion 24. A dimension of the first gap 200 is equal to that of the second gap 260.

The first light guide portion 22 includes two opposite first light incident surfaces 220 at the opposite sides thereof, a first light output surface 224 adjacent to both of the first light incident surfaces 220, and a light reflecting and scattering surface 222 opposite to the light output surface 224. The light reflecting and scattering surface 222 may have a plurality of dots (not shown) formed thereon to achieve the reflecting and scattering function.

The second light guide portion 24 includes a second light incident surface 240 facing the first light output surface 224 of the first light guide portion 22, a second light output surface 244 defined substantially perpendicularly adjoining the second light incident surface 240, and a bottom surface 242 opposite to the second light output surface 244.

The light emitting elements 30 each may be an LED. Each of the light emitting elements 30 faces one of the first light incident surfaces 220 of the first guide portion 22. The light beams emitted from the light emitting elements 30 are first received by the first light incident surfaces 220, then guided in the first light guide portion 22, and then outputted from the first output surface 224 to the second light incident surface 240 of the second light guide portion 24. During this process, a part of the light beams may transmit through the first and second gaps 200, 260 directly to reach the second light incident surface 240 of the second light guide portion 24, another part of the light beams may transmit through the connecting portion 26 to reach the second light guide portion 24.

Due to the configuration of the first light guide portion 22, only two light emitting elements are needed, a dark area caused by each adjacent two light emitting elements will thus be avoided. Due to the light guiding capabilities of the first light guide portion 22, the second light incident surface 240 of the second light guide portion 24 will receive a uniform light, and light outputted from the second light output surface 244 of the second light guide portion 24 will be uniform.

The entire backlight module 100 may be applied in an electronic device, and the second light guide portion 24 may be arranged, for example, under a screen for which backlight is needed.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A backlight module, comprising:
   two light emitting elements for emitting light beams; and
   a light guide plate comprising: a first light guide portion having two opposite first light incident surfaces at opposite side faces of the light guide plate, and a first light output surface, the light emitting elements facing the respective first light incident surfaces; a second light guide portion having a second light incident surface facing the first light output surface of the first light guide portion; and a connecting portion interconnecting the first light output surface of the first light guide portion and the second light incident surface of the second light guide portion, wherein a first gap and a second gap are defined between the second light incident surface and the first light output surface, the first and second gaps respectively exposed at the opposite side faces of the light guide plate.

2. The backlight module as described in claim 1, wherein the first light guide portion, the connecting portion and the second light guide portion are integrally formed into a unitary piece.

3. The backlight module as described in claim 1, wherein the first light guide portion is narrower than the second light guide portion, and a length of the first light guide portion is equal to that of the second light guide portion.

4. The backlight module as described in claim 1, wherein a dimension of the first gap is equal to that of the second gap.

5. The backlight module as described in claim 1, wherein the first light guide portion further has a light reflecting and scattering surface, the first light output surface and the light reflecting and scattering surface being on opposite sides of the first light guide portion.

6. The backlight module as described in claim 1, wherein the second light guide portion further has a second light output surface substantially perpendicularly adjoining the second light incident surface.

7. The backlight module as described in claim 1, wherein each of the first light incident surfaces adjoins the first light output surface.

8. A light guide plate comprising:
   a first light guide portion having two opposite first light incident surfaces at opposite faces of the light guide plate, and a first light output surface;
   a second light guide portion having a second light incident surface facing the first light output surface of the first light guide portion; and
   a connecting portion interconnecting the first light output surface of the first light guide portion and the second light incident surface of the second light guide portion, wherein a first gap and a second gap are defined between the second light incident surface and the first light output surface, the first and second gaps respectively exposed at the opposite side faces of the light guide plate.

9. The light guide plate as described in claim 8, wherein the first light guide portion, the connecting portion and the second light guide portion are integrally formed into a unitary piece.

10. The light guide plate as described in claim 8, wherein the first light guide portion is narrower than the second light guide portion, and a length of the first light guide portion is equal to that of the second light guide portion.

11. The light guide plate as described in claim 8, wherein a dimension of the first gap is equal to that of the second gap.

12. The light guide plate as described in claim 8, wherein the first light guide portion further has a light reflecting and scattering surface, the first light output surface and the light reflecting and scattering surface being on opposite sides of the first light guide portion.

13. The light guide plate as described in claim 8, wherein the second light guide portion further has a second light output surface substantially perpendicularly adjoining the second light incident surface.

14. The light guide plate as described in claim 8, wherein each of the first light incident surfaces adjoins the first light output surface.

* * * * *